April 29, 1924.

W. C. MORDECAI

ADVERTISING DEVICE

Filed April 2, 1921

INVENTOR
Walter C. Mordecai.
BY
ATTORNEYS

April 29, 1924.
W. C. MORDECAI
ADVERTISING DEVICE
Filed April 2, 1921     2 Sheets-Sheet 2
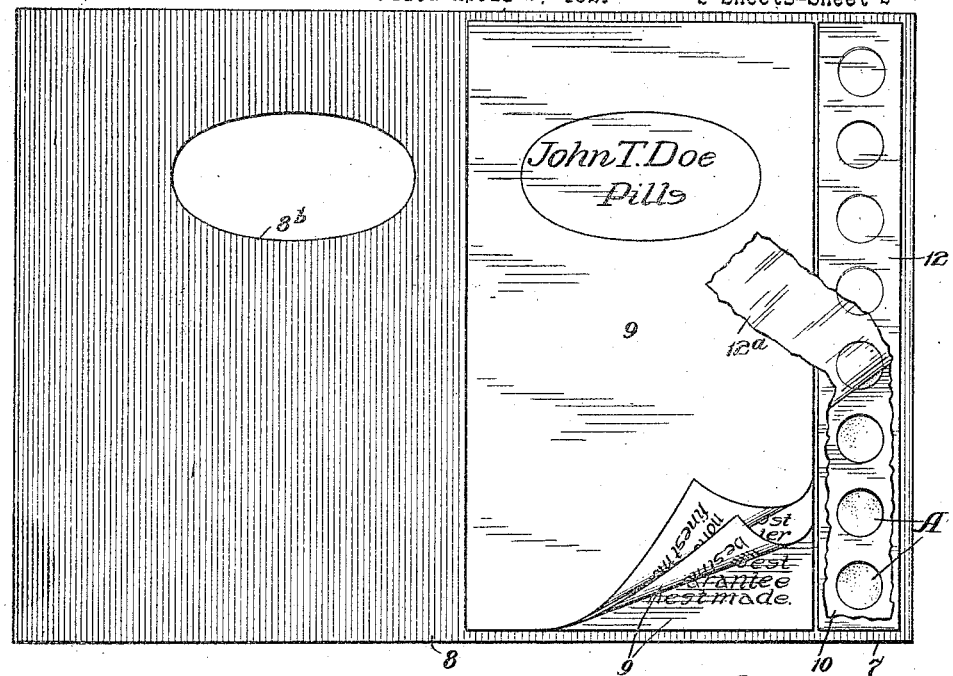
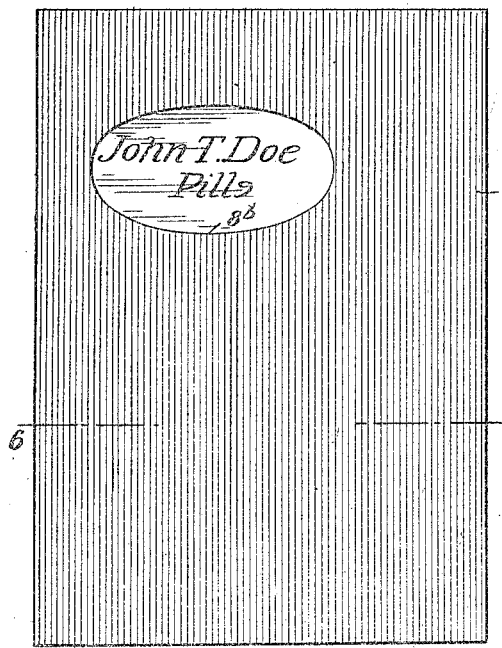
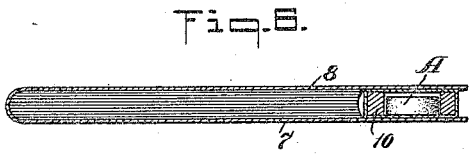
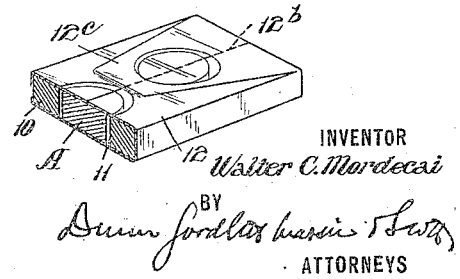
INVENTOR
Walter C. Mordecai
BY
ATTORNEYS Patented Apr. 29, 1924.

1,492,101

UNITED STATES PATENT OFFICE.

WALTER C. MORDECAI, OF KEW GARDENS, LONG ISLAND, NEW YORK.

ADVERTISING DEVICE.

Application filed April 2, 1921. Serial No. 457,858.

*To all whom it may concern:*

Be it known that I, WALTER C. MORDECAI, a citizen of the United States, residing at Kew Gardens, Long Island, county of Queens, and State of New York, have invented a new and useful Improvement in Advertising Devices, of which the following is a specification.

The present invention relates generally to improvements in advertising devices and is more specifically directed to an advertising device which is especially useful in the distribution of samples or specimens of various small articles, such as medicinal and other preparations which may be dispensed in concentrated form, such as tablets, capsules and the like.

Heretofore in advertising it has been the practice to distribute literature relating to different articles or commodities in which it was desired to interest the public, and later on, or some time simultaneously, distribute samples of the articles described in the advertising matter or literature. This method of procedure has been found to have many disadvantages, in view of the fact that where the advertising matter and the samples are distributed at intervals the former is frequently lost or destroyed before the samples are received, so that any interest that may have been aroused in the articles by the advertising matter is permitted to wane. Therefore, this method of advertising is frequently unremunerative. On the other hand, where the advertising matter and samples are simultaneously distributed, they are generally in separate packages, and, even where the interest in the article and the advertising matter is sufficient to result in their preservation, the fact that one is detached from the other many times results in the loss of the literature or advertising matter so that the ultimate result to the advertiser is unsatisfactory.

The general object of the present invention is to provide means whereby advertising matter or literature pertaining to certain articles and samples or specimens of such articles may be simultaneously distributed in a single package, the advertising matter and the samples or specimens being so combined that the preservation of one will result in the preservation of the other. By this means the disadvantages of the present systems or methods of procedure are entirely obviated and the advertiser is enabled to obtain highly satisfactory and profitable results from his advertising activities.

A further object of this invention is to so associate the advertising matter or literature pertaining to certain goods or articles with samples or specimens thereof that the specimens or samples will be constantly displayed during the consideration of the advertising matter or literature, so that any question presenting itself as to the composition, merits or other characteristics of the samples or specimens during the consideration of the advertising matter or literature may be instantly answered by an examination or test of the articles or specimens themselves.

Another object of this invention is to provide a package for samples or specimens of goods of different varieties which is in the form of a pamphlet embodying pages for advertising matter and the like, in which the specimens or samples may be protected from deterioration or contamination by the utilization of protective means which are readily removable to expose the samples, or permit their extraction from the package.

Other objects and advantages of my invention will become obvious as the description proceeds, and I would have it understood that I reserve unto myself all rights to the full range of equivalents both in structure and in uses to which I may be entitled under my invention in its broadest aspect.

In order to obtain a clear and comprehensive understanding of my invention I have elected to illustrate and describe certain embodiments thereof which are particularly adapted to advertising medicinal preparations put up in tablet form. It will be understood, however, that the use of my invention is not confined to goods of the specific character aforesaid, as it may be employed for advertising food stuffs in concentrated form, household articles, such as wash blue, for instance, when put up in tablet form, and innumerable other articles or commodities.

I shall now proceed to describe my invention with reference to the accompanying drawings, and then point out with more particularity the essential elements of novelty therein in the appended claims.

In the drawings;

Fig. 4 is a view similar to Fig. 1 of another form of pamphlet in which a single sample or specimen containing element is employed;

Fig. 5 is a top plan view of the pamphlet shown in Fig. 4 with the cover in closed position;

Fig. 6 is a transverse view on the line 6—6 of Fig. 5; and

Fig. 7 is an enlarged detail in perspective of a section of the sample or specimen containing element shown in Figs. 1, 3, 4 and 6.

Figure 1:
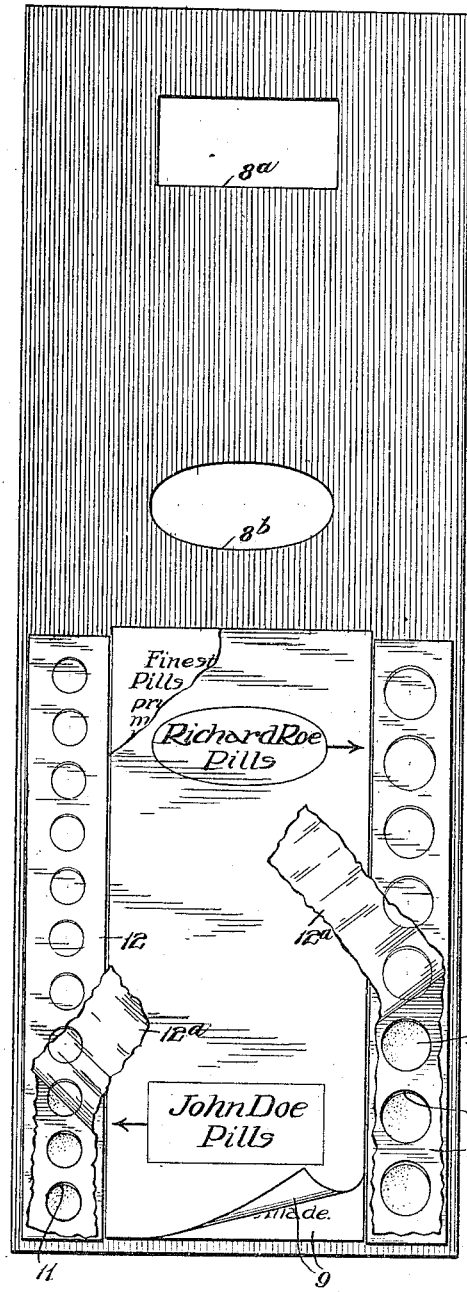
Fig. 1 is a plan view of an advertising device made in accordance with my invention, which is in the form of a pamphlet with the cover extended to disclose the pages for advertising matter or literature and the containers or packages for the specimens or samples associated therewith.
Figure 2:
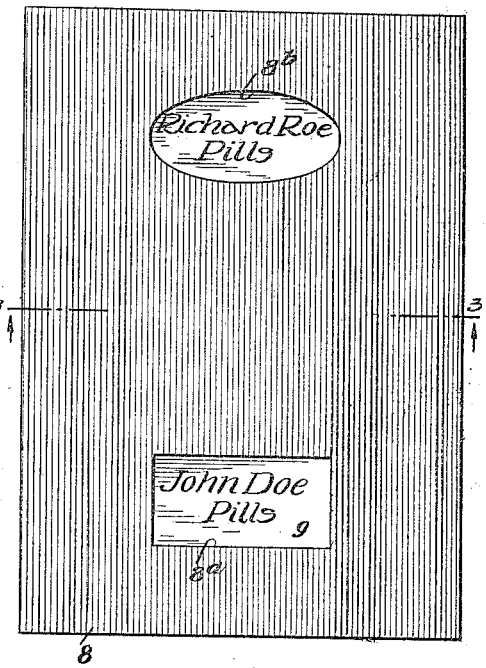
Fig. 2 is a plan view of the pamphlet shown in Fig. 1 when the cover of the pamphlet is closed.
Figure 3:
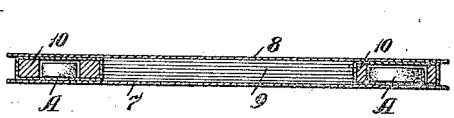
Fig. 3 is a transverse section taken on the line 3—3 of Fig. 2.

Referring now to the drawings in detail in which like characters of reference are employed to designate the similar parts throughout the several views, and more specifically to the embodiment of my invention illustrated in Figs. 1 to 3, inclusive, it will be observed that the pamphlet embodies the customary back and front cover sections 7 and 8 with leaves or pages 9 inserted therebetween and fastened to the pamphlet cover in the usual manner.

Positioned on the inner surface of the back cover 7 of the pamphlet I provide means for retaining or holding samples or specimens of such goods as are described or identified in the printed matter or the like which is carried on pages 9. In the present embodiment of my invention, the sample or specimen containing elements are designed to hold a plurality of tablets A such as are customarily employed in the medical profession. Two of these are provided, each consisting of a narrow strip of wood, cardboard or the like, as shown at 10, having preferably equi-distantly spaced annular apertures 11 cut therein. Obviously these apertures 11 may be rectangular, hexagonal, elliptical, or may take any other shape which will conform to the contour of the tablets which are to be contained therein. Likewise the thickness of the strips of material 10 may vary according to the thickness of the tablets which are to be held in the apertures thereof.

The tablets are held in place within the apertures 11 preferably by means of a transparent covering 12 which is wrapped about the retaining strips 10, this transparent material covering the top and bottom of the apertures. To fill the strip 10 it is preferably placed upon a sheet of the transparent wrapping material of the proper size for enclosing the strip. The tablets are then placed in the respective apertures after which the transparent wrapping material is folded about the strip, the free edges of the material being held in place by a suitable adhesive. From this it will be seen that the strip and the tablets held therein are enveloped in an hermetically sealed wrapper.

Following the filling of the sample retaining elements they are positioned on the inside of the back cover section 7 of the pamphlet in a position adjacent to the outer edges thereof and parallel thereto, as clearly shown in Fig. 1 of the drawings. Any suitable adhesive or other means for positively affixing the sample retaining elements to the pamphlet cover may be employed to hold them in position.

As is clearly apparent from the drawings, the width of pages 9 of the pamphlet is slightly less than the distance between the inside edges of the respective sample retaining elements so that the samples or specimens in the latter will be on view at all times.

The pages 9 may contain any matter pertaining to the goods which are to be advertised by the use of my invention and may include directions for the use of the samples, cuts and the like, or any other matter which is apropos to the subject. Further, if desired, certain of the leaves may be blank for memoranda, or tests, etc., of the samples so as to provide in effect a clinical record. Many other uses to which these leaves or pages 9 may be put will doubtless suggest themselves in the use of my invention. In order to obtain access to the tablets for the purpose of removing the same from the retaining elements the wrapping material 12 may be torn away, as shown at 12$^a$ in Fig. 1 so as to expose the strips 10 and the tablets contained in the apertures thereof. Owing to the fact that the diameter of the apertures 11 is slightly greater than that of the tablets, the latter may be readily removed from the strips 10.

As is apparent from the drawings, the front cover section 8 of the pamphlet is provided with cut-outs 8$^a$ and 8$^b$ which, when the cover is in closed position, register with and frame the printed matter on the topmost page or leaf 9 which may be the title of the goods, the name of the maker or any other matter which is deemed desirable by the advertiser.

In Figs. 4 to 6, inclusive, I have shown a pamphlet of a form which differs from that illustrated in Figs. 1 to 3, inclusive, in which a single sample retaining element is used. This sample retaining element embodies a strip 10, apertures 11 and wrapping material 12, similarly to that described with reference to Figs. 1 to 3, inclusive, the outer edges of the leaves or pages 9 of this form of my invention terminating inwardly of the sample retaining element so that the latter is at no time obscured or covered.

Obviously the wrapping material 12, forming a part of my retaining element, may be applied thereto in any manner which will carry out the purposes of my invention, but in Fig. 7 I have illustrated one method in which the material 12 is folded longitudinally on the strip 10 and the free or outer edge $12^b$ fixed to the body portion by the use of an adhesive. The ends of the material which extend slightly beyond the extremities of the strips 10 are then folded over, as shown at $12^c$, and fixed in position by the application of a cementitious material.

From the foregoing description it will be evident that the arrangement of the leaves 9, for bearing the advertising matter or literature pertaining to the goods in connection with which my invention is employed and their association with the sample retaining elements formed by the strips 10 and the cooperating wrapping material 12, provides an advertising medium which carries out the objects of my invention in a highly efficient and satisfactory manner.

While I have described my invention with reference to the specific embodiments herein shown, it is obvious that various changes may be made in the arrangement or lay-out of the pamphlet and the leaves or pages thereof, also in the method of associating the sample retaining elements with the printed matter or the like pertaining thereto, all of which come within the spirit or scope of my invention.

I claim:

1. An advertising device comprising a booklet having back and front cover members and a pad of leaves adapted to bear printed or other matter pertaining to goods to be advertised by said device secured within said cover members and having one edge spaced from the corresponding edge of said members, and a sample holder mounted upon the face of the back cover member adjacent the inwardly spaced edge of the pad, said sample holder and pad being substantially the same thickness.

2. An advertising device comprising a booklet having back and front cover members and a pad of leaves secured therebetween, one edge of said pad of leaves being spaced inwardly from the corresponding edges of said cover members and a sample holder secured to the back cover member along the spaced edge of the pad, the front cover member being adapted to overlie both pad and sample holder when closed.

3. An advertising device comprising a booklet having back and front cover members, a pad of leaves adapted to bear printed or other matter pertaining to goods to be advertised by said device secured between said cover members and having its opposite edges spaced between the corresponding edges of the cover members and sample holders secured to one of said cover members and arranged along the spaced edges of the pad, said sample holders and pad being substantially the same thickness.

4. An advertising device comprising a booklet having back and front cover members and a plurality of leaves adapted to bear instructions and other data pertaining to the use and characteristics of the goods advertised by said device fixed between said cover members, the edges of said leaves of one side thereof being spaced inwardly of the corresponding edges of the cover members, a relatively rigid strip of material secured to one of said cover members along the spaced edges of said leaves, said strip of material being provided with means for containing specimens of the goods advertised by the device and a substantially transparent cover for said strip whereby the specimens carried thereby may be observed when the booklet is open.

5. An advertising device comprising a booklet embodying front and back cover members and a plurality of leaves secured therebetween, the front cover member being formed with an opening to expose a portion of the first leaf and the edges of the leaves along one side thereof being spaced inwardly of the corresponding edges of said cover members, a sample holder fixed to the back cover member along the spaced edges of said leaves, and means for containing samples therein whereby they may be observed when the booklet is open to disclose data relative to said samples printed on said leaves.

WALTER C. MORDECAI.